(12) United States Patent
Xiong et al.

(10) Patent No.: US 9,040,442 B2
(45) Date of Patent: May 26, 2015

(54) SHAPED OR UNSHAPED REFRACTORY OR KILN FURNITURE COMPOSITION

(75) Inventors: Xiaoyong Xiong, Brussels (BE); Michael Weissenbacher, Innsbruck (AT)

(73) Assignee: Center For Abrasives and Refractories Research & Development C.A.R.R.D. GmbH, Villach (AT)

( * ) Notice: Subject to any disclaimer, the term of this patent is extended or adjusted under 35 U.S.C. 154(b) by 18 days.

(21) Appl. No.: 14/004,980

(22) PCT Filed: Mar. 20, 2012

(86) PCT No.: PCT/EP2012/054900
§ 371 (c)(1), (2), (4) Date: Oct. 3, 2013

(87) PCT Pub. No.: WO2012/126906
PCT Pub. Date: Sep. 27, 2012

(65) Prior Publication Data
US 2014/0024520 A1    Jan. 23, 2014

(51) Int. Cl.
C04B 35/18 (2006.01)
C04B 35/101 (2006.01)
C04B 35/185 (2006.01)
(Continued)

(52) U.S. Cl.
CPC .............. *C04B 35/101* (2013.01); *C04B 35/18* (2013.01); *C04B 35/185* (2013.01); *C04B 35/66* (2013.01); *F23M 5/04* (2013.01); *F23M 2900/05004* (2013.01); *C04B 35/03* (2013.01); *C04B 35/047* (2013.01); *C04B 35/06* (2013.01); *C04B 35/14* (2013.01); *C04B 35/20* (2013.01); *C04B 35/443* (2013.01); *C04B 35/565* (2013.01); *C04B 35/6316* (2013.01); *C04B 2235/3272* (2013.01); *C04B 2235/5409* (2013.01); *C04B 2235/5436* (2013.01); *C04B 2235/5445* (2013.01); *C04B 2235/5463* (2013.01); *C04B 2235/5472* (2013.01); *C04B 2235/5481* (2013.01)

(58) Field of Classification Search
CPC ........ C04B 35/101; C04B 35/18; C04B 35/66
USPC .................................. 501/127, 128
See application file for complete search history.

(56) References Cited

U.S. PATENT DOCUMENTS 6,165,926 A    12/2000   Kriechbaum et al.

FOREIGN PATENT DOCUMENTS

RU    2140407 C1    10/1999
RU    2280016 C2    7/2006
(Continued)

OTHER PUBLICATIONS

Rebouillat, Lionel and Rigaud, Michel, "Andalusite-Based High-Alumina Castables", Journal of the American Ceramic Society, vol. 85, No. 2, 2002, pp. 373-378—XP-002645969.
Routschka, Gerald and Wuthnow, Hartmut, "Cold Strength", Pocket Manual, Refractory Materials, 3$^{rd}$ Ed., 2008, pp. 435-436—XP002645968.
Wutz, Konrad and Straße, Albert-Frank, "Advanced Polymers for Monolithic Refractories", Unified International Technical Conference on Refractories; vol. 2, 2001, pp. 892-903—XP-009149677.

(Continued)

*Primary Examiner* — Karl Group
(74) *Attorney, Agent, or Firm* — Finnegan, Henderson, Farabow, Garrett & Dunner, L.L.P.

(57) ABSTRACT

The present description relates to a refractory composition including 70 weight percent to 98 weight percent particulate refractory material and 2 weight percent to 30 weight percent of a binder phase including reactive filler and a binder, the binder phase substantially includes solely reactive andalusite as reactive filler.

11 Claims, 3 Drawing Sheets

(51) Int. Cl.
  *C04B 35/66* (2006.01)
  *F23M 5/04* (2006.01)
  *C04B 35/03* (2006.01)
  *C04B 35/047* (2006.01)
  *C04B 35/06* (2006.01)
  *C04B 35/14* (2006.01)
  *C04B 35/20* (2006.01)
  *C04B 35/443* (2006.01)
  *C04B 35/565* (2006.01)
  *C04B 35/63* (2006.01)

(56) References Cited

FOREIGN PATENT DOCUMENTS

| RU | 2320617 C2 | 3/2008 |
|---|---|---|
| RU | 2331617 C2 | 8/2008 |
| RU | 2410361 C1 | 1/2011 |
| SU | 1054330 A1 | 11/1983 |
| UA | 24062 U | 6/2007 |
| WO | WO 2008/060161 A1 | 5/2008 |
| WO | WO 2012/126906 A1 | 9/2012 |

OTHER PUBLICATIONS

Brisson, P-Y; Paransky, E.; and Rigaud, M., "Effects of Andalusite Grain Size on Microstructure and Mechanical Properties of Low Cement Alumina-Based Castables", Canadian Metallurgical Quarterly, vol. 42, No. 2, 2002, pp. 157-165—XP-009149708.

Liao, Guihua; He, Keying; Li, Liusheng; and Jiang, Mingxue, "Study on Application of Alumina in High-Purity Andalusite Based Refractory", Journal of Minerals & Materials Characterization & Engineering, vol. 3, No. 2, 2004, pp. 81-89 XP-009149660.

Routschka, G. and Hagemann, L. Bonn, D "Zusammenhänge zwischen Druckfestigkeit und Biegefestigkeit bei feuerfesten Erzeugnissen", Sprechsaal, Verlag Des Sprechsaal Muller und Schmidt, vol. 120, No. 1, 1987, pp. 36-42, 1987, XP-009149687.

Dubreuil, P.; Filari, E.; and Sobolev, V. M., "Use of Andalusite Refractories in Ferrous Metallurgy", Refractories and Industrial Ceramics, vol. 40, No. 5-6, 1999, pp. 252-259—XP009149670.

Prigent P.; Hubert, P.; and Rigaud, M., "Behavior of Andalusite in the Matrix of High Alumina Low Cement Castables", 9$^{th}$ Biennal Worldwide Congress in Refractories, 2005, pp. 203-208—XP-009149661.

International Search Report and Written Opinion issued May 4, 2012, in International Application No. PCT/EP2012/054900.

Decision on Grant of Patent issued Sep. 24, 2014, by Patent Office of the Russian Federation in corresponding Application No. RU 2013 146 785 (8 pages).

SHAPED OR UNSHAPED REFRACTORY OR KILN FURNITURE COMPOSITION

CLAIM FOR PRIORITY

This application is a U.S. national phase entry under 35 U.S.C. §371 from PCT International Application No. PCT/EP2012/054900, filed Mar. 20, 2012, which claims the benefit of priority of European Patent Application No. 11002291.0, filed Mar. 21, 2011, the subject matter of both of which is incorporated herein by reference.

FIELD OF THE INVENTION

The present invention relates to a shaped or unshaped refractory or kiln furniture composition comprising 70 weight percent to 98 weight percent particulate refractory material and 2 weight percent to 30 weight percent binder phase. The present invention also relates to shaped or unshaped refractory or kiln furniture products produced by using the above composition.

A shaped or unshaped refractory or kiln furniture composition usually consists of coarse particulate refractory materials, a fraction of reactive materials, a binder, and additives. The reactive phase or the so called binder phase or matrix comprises reactive fillers together with a binder and if necessary additives such as deflocculating agents, retarders, and accelerators. In modern high-tech castables microsilica or fumed silica and reactive alumina are often used as reactive fillers. The reactive fillers influence the chemical behavior of the binder phase and the properties of the castables, particularly the high temperature properties.

The WO 2008/060161 A1 describes refractory compositions for use in the production of refractory articles such as furnace linings, ladle linings and linings for metallurgical vessels. The refractory compositions according to the above patent application comprise an exothermic material, fine particulate andalusite and fine particulate alumina as well as an inorganic binder. Fine andalusite and fine alumina are used as reactive fillers in the binder phase together with the inorganic binder.

Andalusite, a natural mineral having the chemical formula $Al_2O_3*SiO_2$, is a well known refractory material. The chemical composition of andalusite comprises about 60 weight percent alumina, about 38 weight percent silica and additionally some impurities, such like iron and alkali oxides. Typical compositions of andalusite concentrates are summarized in table 1.

TABLE 1

| concen- | chemical composition (weight percent) | | | | | | | |
|---|---|---|---|---|---|---|---|---|
| trate | $Al_2O_3$ | $SiO_2$ | $Fe_2O_3$ | $TiO_2$ | CaO | MgO | $Na_2O$ | $K_2O$ |
| randalusite | 59.5 | 38.7 | 0.65 | 0.15 | 0.10 | 0.10 | 0.10 | 0.20 |
| purusite | 58.9 | 38.5 | 0.80 | 0.15 | 0.20 | 0.10 | 0.10 | 0.35 |
| krugerite | 57.6 | 40.3 | 0.80 | 0.25 | 0.10 | 0.15 | 0.10 | 0.20 |
| kerphalite | 60.5 | 38.0 | 0.45 | 0.15 | 0.05 | 0.10 | 0.10 | 0.15 |

In castables the fine andalusite is used in order to support the mullite formation (mullitisation) of reactive alumina and fumed silica respectively reactive alumina and sodium silicate during sintering.

SUMMARY OF THE INVENTION

It is an object of the present invention to provide an improved refractory composition particularly for temperatures in the range of 700° C. to 1750° C. It is another object of the present invention to provide a refractory castable having a high strength particularly in a temperature range between 1100° C. and 1750° C. Furthermore it is another object of the present invention to replace or substitute reactive alumina as filler in the matrices of low cement castables (LCC) and ultra low cement castables (ULCC).

It has been found that refractories having an exceptionally high strength in a temperature range between 1100° C. and 1750° C. are obtainable by using a refractory composition comprising 70 weight percent to 98 weight percent particulate refractory material and 2 weight percent to 30 weight percent of a binder phase, wherein the binder phase comprises a reactive filler and a binder. The binder phase or matrix of the refractory composition according to the present invention substantially comprises solely reactive andalusite having an average particle size d50 between 0.2 µm and 2.0 µm as reactive filler.

DESCRIPTION OF THE PREFERRED EMBODIMENTS

Andalusite is an aluminium nesosilicate mineral with the chemical formula $Al_2SiO_5$. The thermally induced transformation of andalusite into mullite according to the reaction

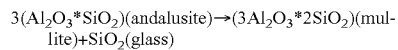

$$3(Al_2O_3*SiO_2)(\text{andalusite}) \rightarrow (3Al_2O_3*2SiO_2)(\text{mullite}) + SiO_2(\text{glass})$$

causes a changing of the properties of the mineral with rising temperatures. After a thermal expansion of about 1% at 1000° C., melting of impurities occurs accompanied by a small shrinkage. The mullitisation starts at 1250° C. and proceeds with rising temperature. Finally, the mass ratio is about 87 weight percent mullite and 13 weight percent glass.

Consequently, andalusite can be used directly as a crude refractory raw material without any preliminary thermal treatment or as a fired refractory material after the above mullite transformation (mullitisation). During the formation of mullite the excess of $SiO_2$ is transformed into glass. The major part of the glass is embedded in the mullite phase, while a small amount is located on the surface of the generated mullite crystals. At high temperatures the glass embedded in the mullite phase softens or fuses and absorbs the volume change of the mullite at high temperatures. Thus, this special type of mullite formed from andalusite exhibit a higher thermal stability than other types of mullite because the softened glass is able to penetrate into crack fissures as a kind of welding agent repairing the damaged mullite during usage. By studying the microstructure as a function of temperature it is possible to reveal the relations between mullite bonding and hot mechanical properties. It can be confirmed that mullitisation closes the surface defects and initial cracks of andalusite grains. The matrix is totally recrystallized into a mullite-glass network interconnected with partially mullitised big grains.

It was found that the above described properties are significantly and unanticipated changed by using a binder phase substantially comprising solely reactive andalusite having an average particle size d50 between 0.2 µm and 2.0 µm, preferably between 0.5 µm and 1.5 µm, as reactive filler.

Following, the present invention is explained in detail by means of examples.

Example 1

Reactive Andalusite

Figure 1:
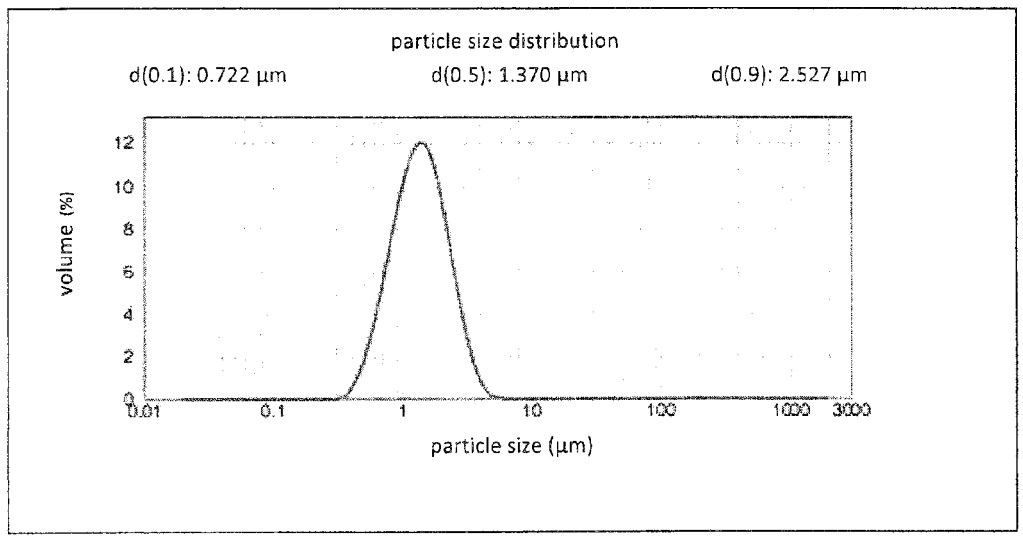
FIG. 1 shows a mastersizer analysis of the particle size distribution of exemplary reactive andalusite.

The below described investigations were realized by using a reactive andalusite produced by milling commercially available andalusite having an average particle size between 2 µm and 5 µm. Using a high energy stirred mill (attritor grinding mill), reactive andalusite having an average particle size d50=1.37 µm, an extremely narrow particle size distribution characterized by d10=0.72 µm and d90=2.53 µm, and a specific surface area (BET) of 15.27 m$^2$/g was obtained. FIG. 1 shows a mastersizer analysis of the particle size distribution of reactive andalusite.

Comparable values for reactive andalusite were found using other grinding methods or different raw materials, whereby the average particle size ranges between 0.2 µm and 2.0 µm, the particle size distribution has a width of particles sizes of less than 2.5 µm, and the specific surface area (BET) ranges between 10 m$^2$/g and 25 m$^2$/g.

Figure 2:
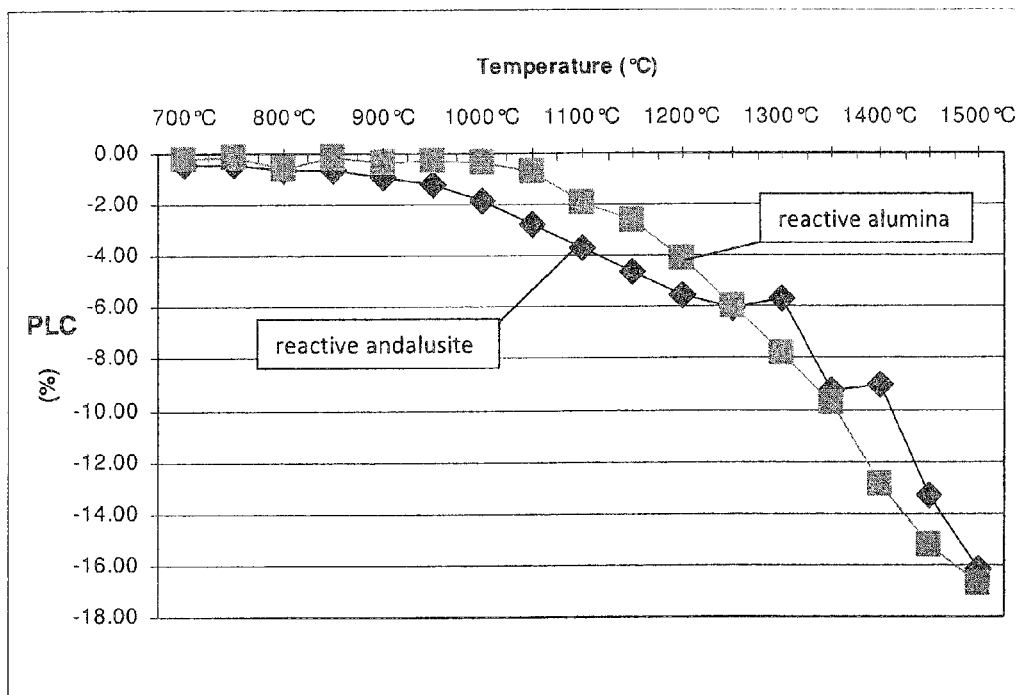
FIG. 2 shows the shrinkage (PLC) of exemplary reactive andalusite in comparison with reactive alumina.

The reactivity of reactive andalusite in comparison with reactive alumina was tested by measuring the shrinkage (Permanent Linear Change; PLC) of test pieces prepared by dry pressing the respective materials without any additives in a mould of 50 mm×10 mm×10 mm using a pressure of 1000 kg/cm$^2$ in a temperature range between 700° C. and 1500° C. For these comparative tests reactive alumina characterized by d10=0.28 µm, d50=0.93 µm, d90=2.81 µm, and a specific surface area (BET) of 6.55 m$^2$/g was used. The test results are graphically reproduced in FIG. 2. As shown in FIG. 2 the shrinkage (PLC) of the test pieces increases in a temperature range from 700° C. to 1500° C. from about −0.3 at 700° C. up to about −17.0% at 1500° C.

Figure 3:
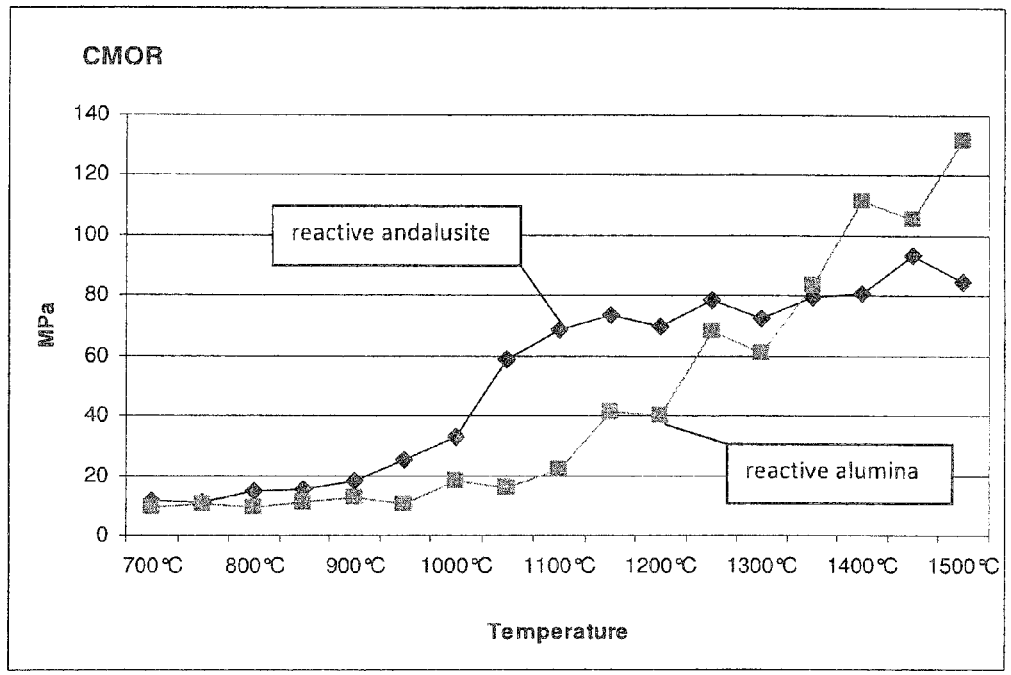
FIG. 3 shows the Cold Module of Rupture of exemplary reactive andalusite in comparison with reactive alumina.

The mechanical strength of reactive andalusite in comparison with reactive alumina was tested by measuring the Cold Module of Rupture (CMOR) according to EN 1402-5 of identical test pieces in the same temperature range. The test results are graphically reproduced in FIG. 3. As shown in FIG. 3 the CMOR of reactive andalusite starts to increase significantly at a temperature of about 950° C. The temperature profile of CMOR starts from about 10 MPa at 700° C. to up to about 90 MPa at 1500° C. The graph indicates that the mullite formation starts at 950° C. and is completed at 1350° C. The temperature profile implies that in case of reactive andalusite the mullite formation starts 200° C. lower in comparison with conventional compositions using reactive alumina.

Reactive andalusite is versatilely applicable and can be advantageously combined with particulate refractory materials selected from the group consisting of silica, silicon carbide, alumina, bauxite, spinel, calcined dolomite, chrome magnesite, olivine, forsterite, mullite, kyanite, silimanite, andalusite, chamotte, or mixtures of two or more of those materials.

Example 2

Reactive Andalusite Castable

TABLE 2

| | | | weight percent | |
|---|---|---|---|---|
| raw materials | | particle size | present invention | Comparative example |
| particulate refractory material | white fused alumina | 2-5 mm | 33 | 33 |
| | white fused alumina | 1-3 mm | 10 | 10 |
| | white fused alumina | 0-1 mm | 20 | 20 |
| | white fused alumina | 0-0.3 mm | 15 | 15 |
| | calcined alumina | 5 µm | 11 | 11 |
| binder phase | reactive andalusite | 0.2-2 µm | 6 | — |
| | reactive alumina | 0.2-2 µm | — | 6 |
| | cement secar 71 | | 5 | 5 |
| | STPP = sodium tripolyphosphate | | 0.15 | 0.15 |

Typical castable compositions are summarized in table 2. Both compositions in table 2 are identical except that the composition according to the present invention comprises reactive andalusite as reactive filler, while a comparative composition comprises reactive alumina.

Pure alumina castables were used in order to obtain a direct comparison of the bonding efficiency of compositions comprising reactive andalusite respectively reactive alumina. The comparison of the mechanical strength of the castable compositions of table 2 with regard to their Cold Module of Rupture (CMOR) according to EN 1402-5 and their Cold Crush Strength (CCS) according to 1402-6 is shown in FIGS. 4 and 5.

Figure 4:
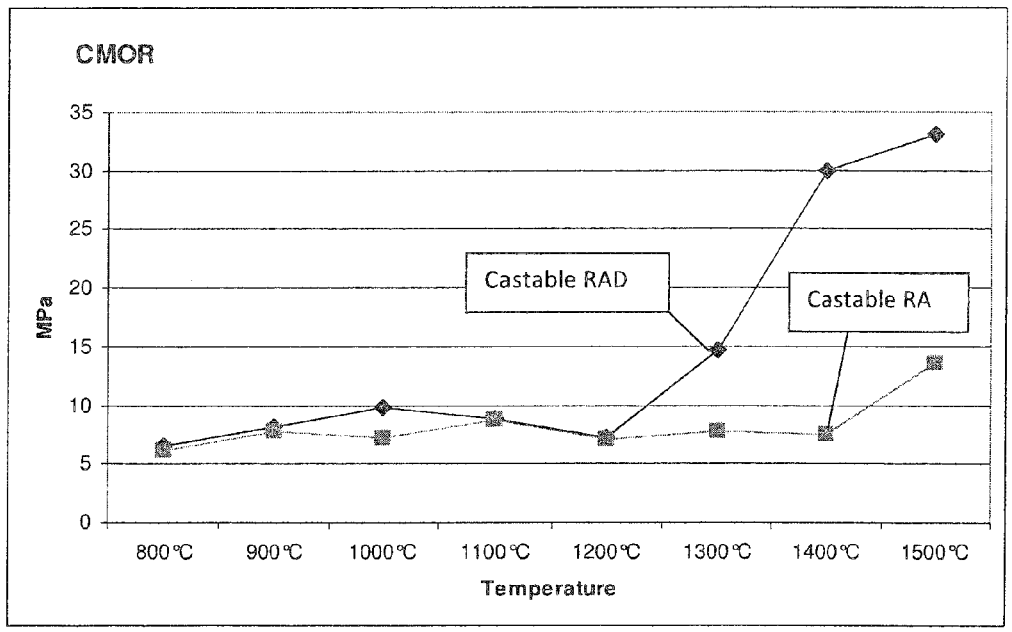
FIG. 4 shows the Cold Module of Rupture of exemplary castable reactive andalusite in comparison with castable reactive alumina.
Figure 5:
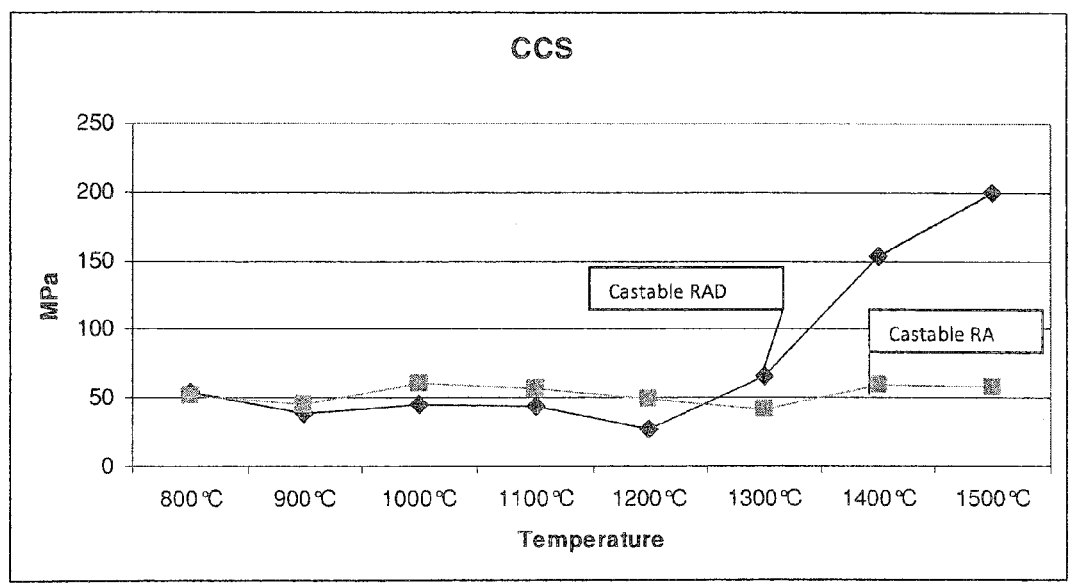
FIG. 5 shows the Cold Crush Strength of exemplary castable reactive andalusite in comparison with castable reactive alumina.

As shown in FIGS. 4 and 5 in the medium temperature range (800° C.-1200° C.) the bonding strength of both castables has nearly the same level (Castable RAD=comprising reactive andalusite; Castable RA=comprising reactive alumina). At higher temperatures reactive andalusite generates an additional bonding by secondary mullite formation between the glass phase on the surface of andalusite-mullite and the calcined alumina and white fused alumina. Thus, the mechanical properties of the castables comprising reactive andalusite are improved.

It can be stated that for applications, where hot mechanical properties are the key parameters to complete the appropriate performance, reactive andalusite is a promising reactive filler for a temperature range between 1100° C. and 1750° C.

Checking various applications of reactive andalusite in comparison with reactive alumina it was found that refractory castables or casted pieces produced by using a refractory composition according to the present invention sintered in a temperature range between 1100° C. and 1750° C. generally have a CMOR measured according to EN 1402-5 of more than 5 MPa and a Cold Crush Strength (CCS) measured according to EN 1402-6 of more than 30 MPa.

In this context reactive andalusite was used in low cement castables (LCC) having a cement content of about 5 weight percent as well as in ultra low cement castables (ULCC) having a cement content of about 2 weight percent.

In table 3 some more applications for the composition according to the present invention are summarized with regard to their CMOR and CCS. The materials and products summarized in table 1 were sintered in a temperature range between 1100 and 1750° C.

TABLE 3

| application | CMOR | CCS |
|---|---|---|
| refractory ramming material | >5 MPa | >30 MPA |
| refractory gunning material | >3 MPa | >20 MPa |
| fired or unfired refractory bricks | >8 MPa | >50 MPA |
| kiln furniture | >8 MPa | >50 MPa |

Testing the above mentioned applications typical refractory compositions were used in accordance with the composition according to the present invention having a binder phase substantially comprising solely reactive andalusite as reactive filler. All measured CMOR- and CCS-values were above the limiting values as shown in table 3.

On basis of the above results it is concluded that reactive andalusite is an appropriate reactive filler in order to substitute reactive alumina for high temperatures applications. Beside the technical advantages of reactive andalusite in the medium temperature range (1100° C.-1400° C.) reactive andalusite stands out due to a significant cost advantage in comparison to reactive alumina.

The invention claimed is:

1. A shaped or unshaped refractory or kiln furniture composition comprising 70 weight percent to 98 weight percent particulate refractory material and 2 weight percent to 30 weight percent of a binder phase comprising a reactive filler and a binder,
wherein the binder phase substantially comprises solely reactive andalusite having an average particle size $d_{50}$ between 0.2 μm and 2.0 μm as reactive filler, and wherein the reactive andalusite has a narrow particle size distribution having a width of particles sizes in a range of less than 2.5 μm.

2. The composition according to claim 1, wherein the reactive andalusite has an average particle size $d_{50}$ between 0.5 μm and 1.5 μm.

3. The composition according to claim 1, wherein the reactive andalusite has a specific surface area ranging from 10 m²/g to 25 m²/g.

4. The composition according to claim 1, wherein the particulate refractory material is selected from the group consisting of silica, silicon carbide, alumina, bauxite, spinel, calcined dolomite, chrome magnesite, olivine, forsterite, mullite, kyanite, silimanite, andalusite, chamotte, or a mixture of two or more of those materials.

5. A refractory casted piece comprising the refractory composition according to claim 1, wherein the casted piece is sintered at a temperature ranging from 1100° C. to 1400° C., has a Cold Module of Rupture measured according to EN 1402-5 of more than 5 MPa, and a Cold Crush Strength measured according to EN 1402-6 of more than 30 MPa.

6. The refractory casted piece according to claim 5, wherein the composition is a low cement castable having a cement content of about 5 weight percent.

7. The refractory casted piece according to claim 5, wherein the composition is an ultra-low cement castable having a cement content of about 2 weight percent.

8. A refractory ramming material comprising the refractory composition according to claim 1, wherein the refractory ramming material is configured to be sintered at a temperature ranging from 1100° C. to 1750° C., and following sintering, has a Cold Module of Rupture measured according to EN 1402-5 of more than 5 MPa, and a Cold Crush Strength according to EN 1402-6 of more than 30 MPa.

9. A refractory gunning material comprising the refractory composition according to claim 1, wherein the refractory gunning material is configured to be sintered at a temperature ranging from 1100° C. to 1750° C., and following sintering, has a Cold Module of Rupture measured according to EN 1402-5 of more than 3 MPa, and a Cold Crush Strength according to EN 1402-6 of more than 20 MPa.

10. A fired refractory brick comprising the refractory composition according to claim 1, wherein the fired refractory brick is sintered at a temperature ranging from 1100° C. to 1750° C., has a Cold Module of Rupture measured according to EN 1402-5 of more than 8 MPa, and a Cold Crush Strength according to EN 1402-6 of more than 50 MPa.

11. A kiln furniture comprising the refractory composition according to claim 1, wherein the kiln furniture is sintered at a temperature ranging from 1100° C. to 1750° C., has a Cold Module of Rupture measured according to EN 1402-5 of more than 8 MPa, and a Cold Crush Strength according to EN 1402-6 of more than 30 MPa.

* * * * *